(12) United States Patent
Chasman et al.

(10) Patent No.: US 8,538,994 B2
(45) Date of Patent: *Sep. 17, 2013

(54) METHODS AND PROCEDURES TO PROVIDE COMPLETE TEST COPY ENVIRONMENT OF HOSTED APPLICATIONS

(75) Inventors: Douglas Chasman, Pittsford, NY (US); Daniel Soble, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,055

(22) Filed: Oct. 31, 2011

(65) Prior Publication Data

US 2012/0271857 A1    Oct. 25, 2012

Related U.S. Application Data

(63) Continuation of application No. 12/488,288, filed on Jun. 19, 2009, now Pat. No. 8,051,101, which is a continuation of application No. 11/612,706, filed on Dec. 19, 2006, now Pat. No. 7,634,505.

(51) Int. Cl.
*G06F 17/30* (2006.01)

(52) U.S. Cl.
USPC ............ 707/791; 707/802; 707/822; 707/828

(58) Field of Classification Search
USPC ................................................ 707/600–899
See application file for complete search history.

(56) References Cited

U.S. PATENT DOCUMENTS

2006/0206507 A1*  9/2006  Dahbour ...................... 707/100

* cited by examiner

*Primary Examiner* — Isaac M Woo
(74) *Attorney, Agent, or Firm* — Haynes Beffel & Wolfeld LLP; Ernest J. Beffel, Jr.

(57) ABSTRACT

Systems and methods that create a duplicate database instance on which database testing may be performed. The techniques for creating a test database instance enable database testing to proceed without impacting other organization's access to their data in the database or corrupting an organization's data. The ability to allow one organization ("org") to test their portion of a database without interrupting other organizations from using their portions of the database enables a database system to support more than one organization as tenants.

19 Claims, 5 Drawing Sheets

METHODS AND PROCEDURES TO PROVIDE COMPLETE TEST COPY ENVIRONMENT OF HOSTED APPLICATIONS

CROSS-REFERENCES TO RELATED APPLICATIONS

The present application is a continuation of U.S. Non-Provisional application Ser. No. 12/488,288 filed on Jun. 19, 2009, which issued as U.S. Pat. No. 8,051,101 on Nov. 1, 2011, which claims priority from and is a continuation of U.S. Non-Provisional application Ser. No. 11/612,709 filed on Dec. 19, 2006, which issued as U.S. Pat. No. 7,634,505 on Dec. 15, 2009, the entire contents of both of which are herein incorporated by reference for all purposes.

FIELD OF THE INVENTION

The present invention relates generally to database systems, and more particularly to systems and methods for providing a test environment for a database.

BACKGROUND

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

One area that continues to be a goal of administrators of database systems is the ability to test the database. In particular, it would be desirable to provide a testing environment in which database testing may occur without impacting or corrupting an organization's data, or otherwise adversely impacting the organization's database.

Unfortunately, conventional database testing approaches do not lend themselves to automated techniques for generating a testing instance. In fact, conventional approaches to database test, such as for example, toolkits provided by PeopleSoft that import and/or export data over an odbc connection or via a flat file, require making a copy of an entire database instance. Unfortunately, during the time that the copy database instance is being made from the production database instance, no one is able to access the primary database instance. Also, these systems do not provide for single button copying of just metadata or metadata and business data together.

Therefore it is desirable to provide systems and methods that overcome the above and other problems. In particular, it is desirable to provide a test copy environment in which database testing may occur without impacting or corrupting an organization's data, or otherwise adversely impacting the organization's database.

BRIEF SUMMARY

The present invention provides systems and methods that create a duplicate database instance on which database testing may be performed. These techniques for creating a test database instance can enable database testing to proceed without impacting other organization's access to their data in the database or corrupting an organization's data. The ability to allow one organization ("org") to test their portion of a database without interrupting other organizations from using their portions of the database enables a database system to support more than one organization as tenants. Embodiments may enable single button copying of just metadata or metadata and business data together. Metadata may include applications stored as metadata for execution on an on-demand application platform.

According to one embodiment of the present invention, a method of creating a test database instance from a database instance is provided. The method typically includes receiving a request to create a test database instance for a first database instance on a source system. The request is received from a requestor at a first organization and the request identifies a portion of the first database instance that the requestor at the first organization is permitted to access. The request is processed by copying the portion of the first database instance to a target system so as to form the test database instance on the target system. The copy process proceeds substantially contemporaneous with, and substantially without interference with, processing at least one other request to access other portion(s) of the first database instance received from other requestor(s) at other organization(s). Subsequent requests from requestor(s) at the first organization are directed to the test database instance instead of the first database instance, thereby enabling testing.

Present embodiments may be advantageously implemented in a multi-tenant database and/or between multi-tenant databases in contrast with conventional approaches. Embodiments may enable single button copying of just metadata or metadata and business data together. Metadata may include applications stored as metadata for execution on an on-demand application platform. In certain embodiments, the copy process optionally provides various functionality, including, for example one or more of: algorithmic selection of optimal copy strategy based on various criteria; intra-table resume support via durable milestones; parallel table copy; metadata only copy; swappable multiple copies (alternating active destination instances—copy into B when A is active, switch to B on copy completion, schedule A copy for deletion); search index file copy using raw Lucene data files to remove any need to re-index an organization's database; multiple virtual queues (parallel vs. single threaded); RAC support (source and target node awareness); invalid character data auto conversion support (source is non-unicode and target is unicode database); local copying; and soft trigger disable.

According to one aspect, a method is provided for creating a test database instance from a database instance. The method typically includes receiving a request to create a test database instance for a first database instance on a source system, wherein the request is received from a requestor at a first organization and wherein the request identifies a portion of the first database instance that the requestor at the first organization is permitted to access. The method also typically includes processing the request by copying the portion of the first database instance to a target system so as to form the test database instance on the target system, the copy process proceeding substantially contemporaneous with, and substantially without interference with, processing at least one other request to access other portion(s) of the first database instance received from other requestor(s) at other organization(s), and directing subsequent requests from requestor(s) at the first organization to the test database instance instead of the first database instance. In this manner testing is enabled on the test instance.

According to another aspect, a machine-readable medium is provided which carries or stores one or more sequences of instructions for creating a test database instance from a database instance in a multi-tenant database system. The instructions, when executed by one or more processors, cause the one or more processors to receive a request to create a test database instance for a first database instance on a source system, the request being received from a requestor at a first organization, wherein the request identifies a portion of the first database instance that the requestor at the first organization is permitted to access. The instructions further cause the one or more processors to process the request by copying the portion of the first database instance to a target system so as to form the test database instance on the target system, the copy process proceeding substantially contemporaneous with, and substantially without interference with, processing at least one other request to access other portion(s) of the first database instance received from other requestor(s) at other organization(s), and to direct subsequent requests from requestor(s) at the first organization to the test database instance instead of the first database instance, thereby enabling testing.

According to yet another aspect, an apparatus is provided for creating a test database instance from a database instance in a multi-tenant database. The apparatus typically includes a processor and one or more stored sequences of instructions which, when executed by the processor, cause the processor to receive a request to create a test database instance for a first database instance on a source system, the request being received from a requestor at a first organization, wherein the request identifies a portion of the first database instance that the requestor at the first organization is permitted to access. The one or more stored sequences of instructions further cause the processor to process the request by copying the portion of the first database instance to a target system so as to form the test database instance on the target system, the copy process proceeding substantially contemporaneous with, and substantially without interference with, processing at least one other request to access other portion(s) of the first database instance received from other requestor(s) at other organization(s), and to direct subsequent requests from requestor(s) at the first organization to the test database instance instead of the first database instance, thereby enabling testing.

According to still a further aspect, a method is provided for transmitting code on a transmission medium for creating a test database instance from a database instance in a multi-tenant database system. The method typically includes transmitting code for receiving a request to create a test database instance for a first database instance on a source system, the request being received from a requestor at a first organization, wherein the request identifies a portion of the first database instance that the requestor at the first organization is permitted to access. The method also typically includes transmitting code for processing the request by copying the portion of the first database instance to a target system so as to form the test database instance on the target system, the copy process proceeding substantially contemporaneous with, and substantially without interference with, processing at least one other request to access other portion(s) of the first database instance received from other requestor(s) at other organization(s), and transmitting code for directing subsequent requests from requestor(s) at the first organization to the test database instance instead of the first database instance, thereby enabling testing.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

The present invention provides systems and methods for providing a test copy environment in an on-demand multi-tenant database service. A copy of an organization's set-up data or set-up data and instance data is created in a target database system to provide a test environment. The test environment advantageously allows users within an organization to test integrations with external applications and/or provide user training on the database without the potential for adversely impacting the organization's real database instance or the operations of other organizations on their real database instance when multiple organizations' database instances are incorporated into a multi-tenant architecture. The target system may be located within the same database system or a different database system from which the copy derives.

As used herein, the term multi-tenant database system refers to those systems in which various elements of hardware and software of the database system may be shared by one or more organizations (or "tenants"). For example, a given application server may simultaneously process requests for a great number of organizations, and a given database table may store rows for a potentially much greater number of organizations.

Some embodiments provide metadata only copy. In such embodiments, a selection of at least one of set-up data and instance data may be copied by one or more tasks executing on the target system, As used herein, "set-up data" refers to the metadata for the various tables associated with an organization in the multi-tenant database system, and "instance data" refers to the business data, e.g., real data, associated with the organization. Together, the set-up data and instance data define the organization's data model, user interface, business logic and data in an on-demand multi-tenant database system. Metadata may include applications stored as metadata for execution on an on-demand application platform.

Next, mechanisms and methods for creating a test database instance from a database instance will be described with reference to example embodiments.

System Overview

Figure 1:
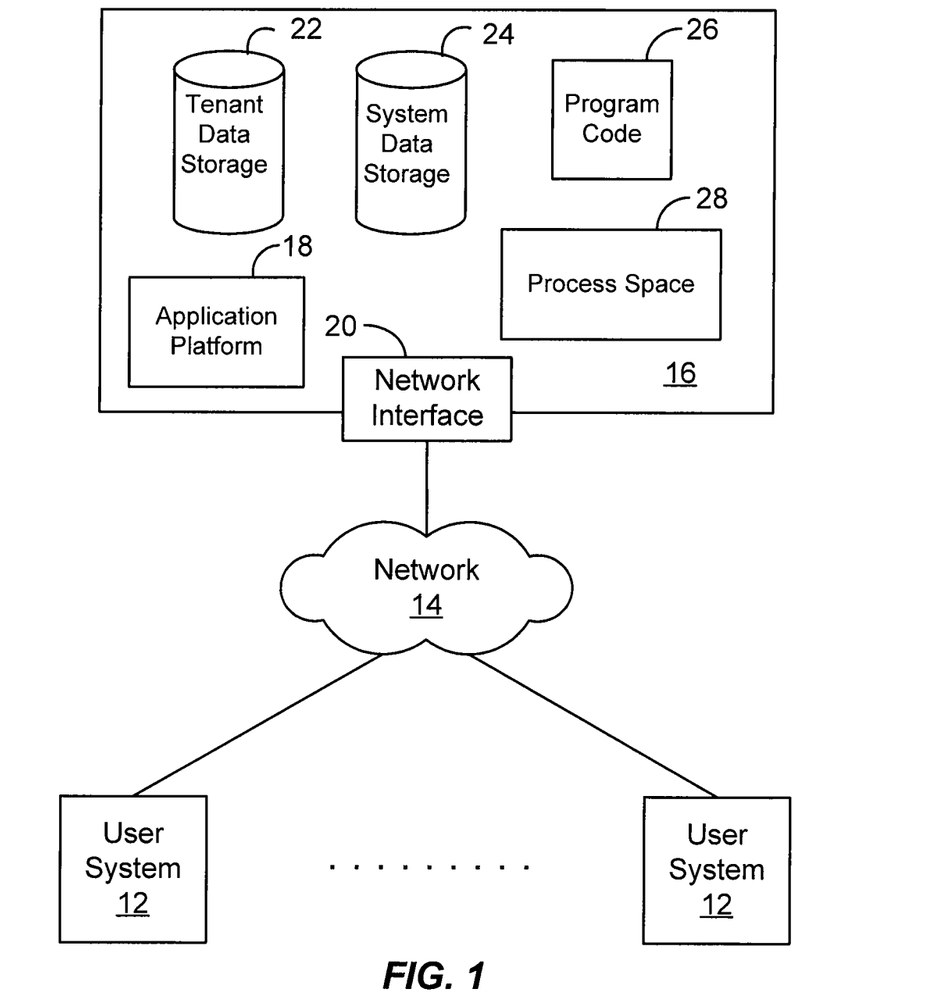
FIG. 1 illustrates an environment wherein an on-demand database service might be used.

FIG. 1 illustrates an environment wherein an on-demand database service might be used. As illustrated in FIG. 1 (and in more detail in FIG. 2) user systems 12 might interact via a network 14 with an on-demand database service 16. Some on-demand database services may store information from one or more tenants stored into tables of a common database image to form a multi-tenant database system (MTS). Accordingly, on-demand database service 16 and system 16 will be used interchangeably herein. A database image may include one or more database objects. A relational database management system (RDMS) or the equivalent may execute storage and retrieval of information against the database object(s). Some on-demand database services may include an application platform 18 that enables creation, managing and executing one or more applications developed by the provider of the on-demand database service, users accessing the on-demand database service via user systems 12, or third party application developers accessing the on-demand database service via user systems 12.

The users of those user systems 12 might be users in differing capacities, and the capacity of a particular user system 12 might be entirely determined by permissions (permission levels) for the current user. For example, where a salesperson is using a particular user system 12 to interact with System 16, that user system has the capacities allotted to that salesperson. However, while an administrator is using that user system to interact with System 16, that user system has the capacities allotted to that administrator. In systems with an hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems 12 might communicate with System 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at System 16. Such HTTP server might be implemented as the sole network interface between System 16 and network 14, but other techniques might be used as well or instead. In some implementations, the interface between System 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations are contemplated.

In one embodiment, the system shown in FIG. 1 implements a web-based customer relationship management (CRM) system. For example, in one embodiment, System 16 includes application servers configured to implement and execute CRM software applications as well as provide related data, code, forms, Web pages and other information to and from user systems 12 and to store to, and retrieve from, a database system related data, objects and Web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of System 16 is shown in FIG. 1, including a network interface 20, application platform 18, storage 22 for tenant data, storage 24 for system data accessible to System 16 and possibly multiple tenants, program code 26 for implementing various functions of System 16, and a process space 28 for executing MTS system processes and tenant-specific processes, such as running applications as part of an application hosting service. Additional processes that may execute on System 16 include database indexing processes.

Several elements in the system shown in FIG. 1 include conventional, well-known elements that need not be explained in detail here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from System 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by System 16 or other systems or servers. For example, the user interface device can be used to access data and applications hosted by System 16, and to perform searches on stored data, and otherwise allow a user to interact with various GUI pages that may be presented to a user.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, System 16 (and additional instances of an MTS, where more than one is present) and all of their components might be operator configurable using application(s) including computer code run using a central processing unit such as an Intel Pentium® processor or the like, or multiple processor units. A computer program product embodiment includes a machine-readable storage medium (media) having instructions stored thereon/in which can be used to program a computer to perform any of the processes of the embodiments described herein. Computer code for operating and configuring System 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

According to one embodiment, each System 16 is configured to provide web pages, forms, applications, data and media content to user (client) systems 12 to support the access by user systems 12 as tenants of System 16. As such, System 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
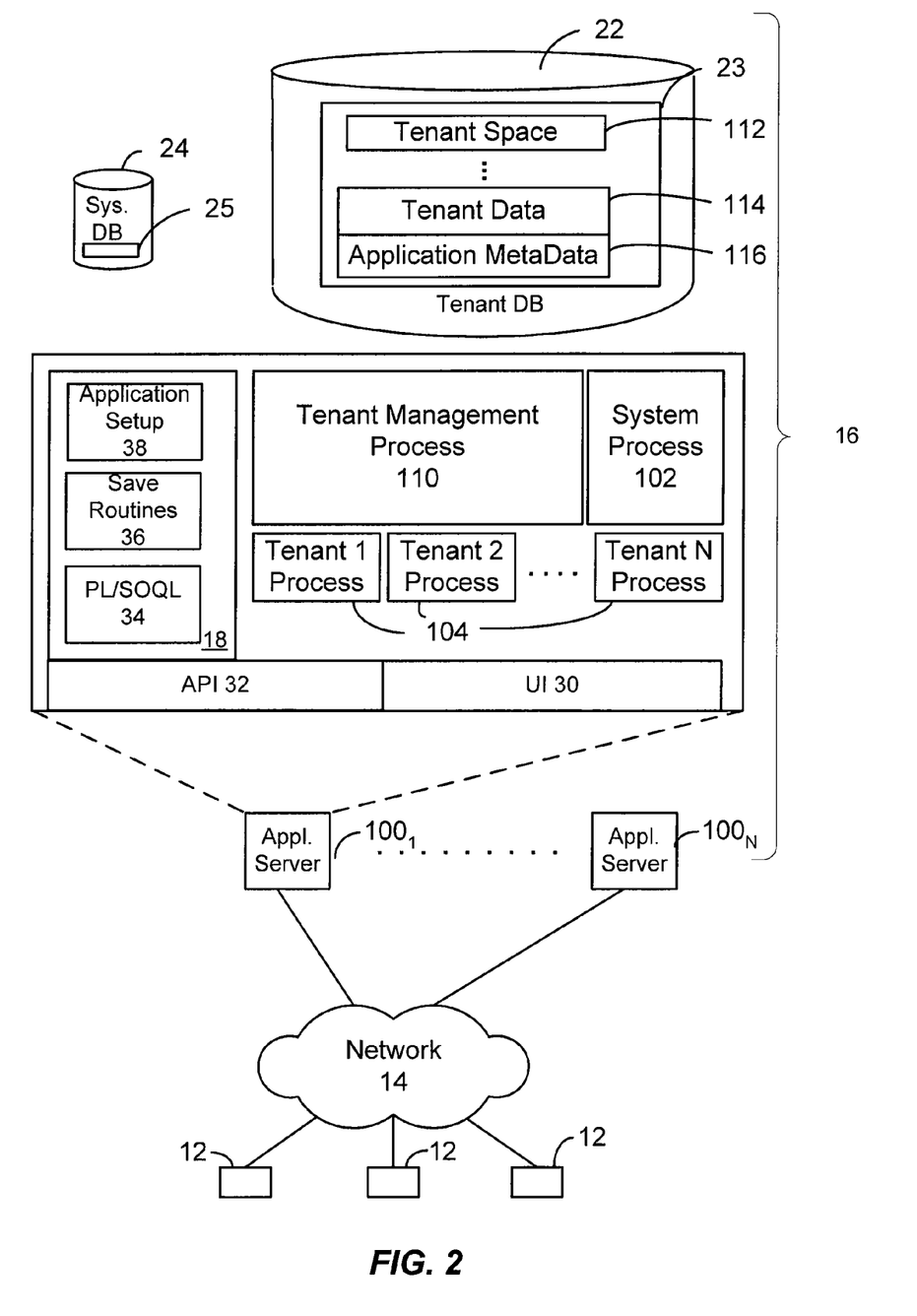
FIG. 2 illustrates elements of an example system 16 of FIG. 1 and various interconnections in one embodiment.

FIG. 2 illustrates elements of an example System 16 and various interconnections in an embodiment. As shown by FIG. 2, example System 16 includes a network interface 20 (of FIG. 1) implemented as one or more HTTP application servers 100, an application platform 18 and database objects 106, 108. Also shown is system process space 102, including individual tenant process spaces 104, a tenant management process space 110 and database objects 106, 108. A Tenant database 108 might be divided into individual tenant storage areas 112, which can be either a physical arrangement or a logical arrangement. Within each tenant storage area 112, user storage 114 and application storage 116 might similarly be allocated for each user. For example, a copy of a user's most recently used (MRU) items might be stored to user storage area 114. Similarly, a copy of MRU items for an entire organization that is a tenant might be stored to tenant storage area 112. A user interface UI 30 provides a user interface and an API 32 provides an application programmer interface to System 16 resident processes to users and/or developers at user systems 12.

Application platform 18 includes an application setup mechanism 38 that supports application developers' creation and management of applications, which may be saved as metadata into tenant database 108 by save routines 36 for execution by subscribers as one or more tenant processes 104 managed by tenant management process 110 for example. Invocations to such applications may be coded using PL/SOQL 34 that provides a programming language style interface extension to API 32. Invocations to applications may be detected by one or more system processes, which manage retrieving application metadata 116 for the subscriber making the invocation and executing the metadata as an application in a virtual machine.

It should also be understood that each application server 100 may be communicably coupled to database systems, e.g., system database 106 and tenant database(s) 108, via a different network connection. For example, one server 100₁ might be coupled via the Internet 14, another server 100N-1 might be coupled via a direct network link, and another server 100N might be coupled by yet a different network connection. Transfer Control Protocol and Internet Protocol (TCP/IP) are typical protocols for communicating between servers 100 and the database system; however, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the servers 100 and the user systems 12 to distribute requests to the servers 100. In one embodiment, the load balancer uses a least connections algorithm to route user requests to the servers 100. Other examples of load balancing algorithms, such as round robin and observed response time, also can be used. For example, in certain embodiments, three consecutive requests from the same user could hit three different servers 100, and three requests from different users could hit the same server 100. In this manner, System 16 is multi-tenant, wherein System 16 handles storage of, and access to, different objects, data and applications across disparate users and organizations.

As an example of storage, one tenant might be a company that employs a sales force where each salesperson uses System 16 to manage their sales process. Thus, a user might maintain contact data, leads data, customer follow-up data, performance data, goals and progress data, etc., all applicable to that user's personal sales process (e.g., in tenant database 108). In an example MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by System 16 that are allocated at the tenant level while other data structures might be managed at the user level. Because an MTS might support multiple tenants including possible competitors, the MTS should have security protocols that keep data, applications, and application use separate. Also, because many tenants will opt for access to an MTS rather than maintain their own system, redundancy, up-time, and backup are additional critical functions and need to be implemented in the MTS.

In addition to user-specific data and tenant-specific data, System 16 might also maintain system level data usable by multiple tenants or other data. Such system level data might include industry reports, news, postings, and the like that are sharable among tenants.

In certain embodiments, client systems 12 communicate with application servers 100 to request and update system-level and tenant-level data from System 16 that may require one or more queries to database system 106 and/or database system 108. System 16 (e.g., an application server 100 in System 16) automatically generates one or more SQL statements (the SQL query) designed to access the desired information. Database system 108 may generate query plans to access the requested data from the database.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields. It should be understood that "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3A:
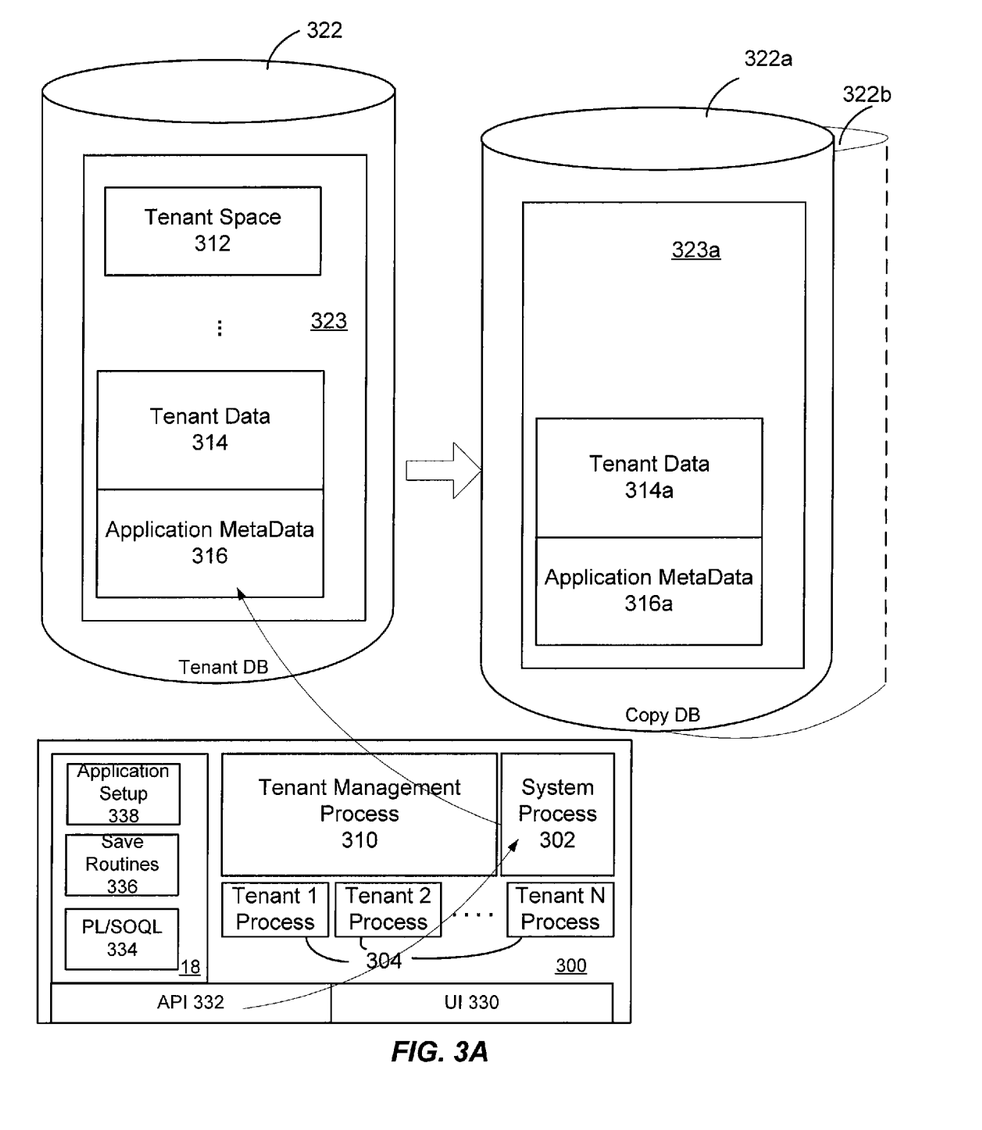
FIGS. 3A-3B illustrate an example architecture of a mechanism for creating a test database instance in an embodiment.
Figure 3B:
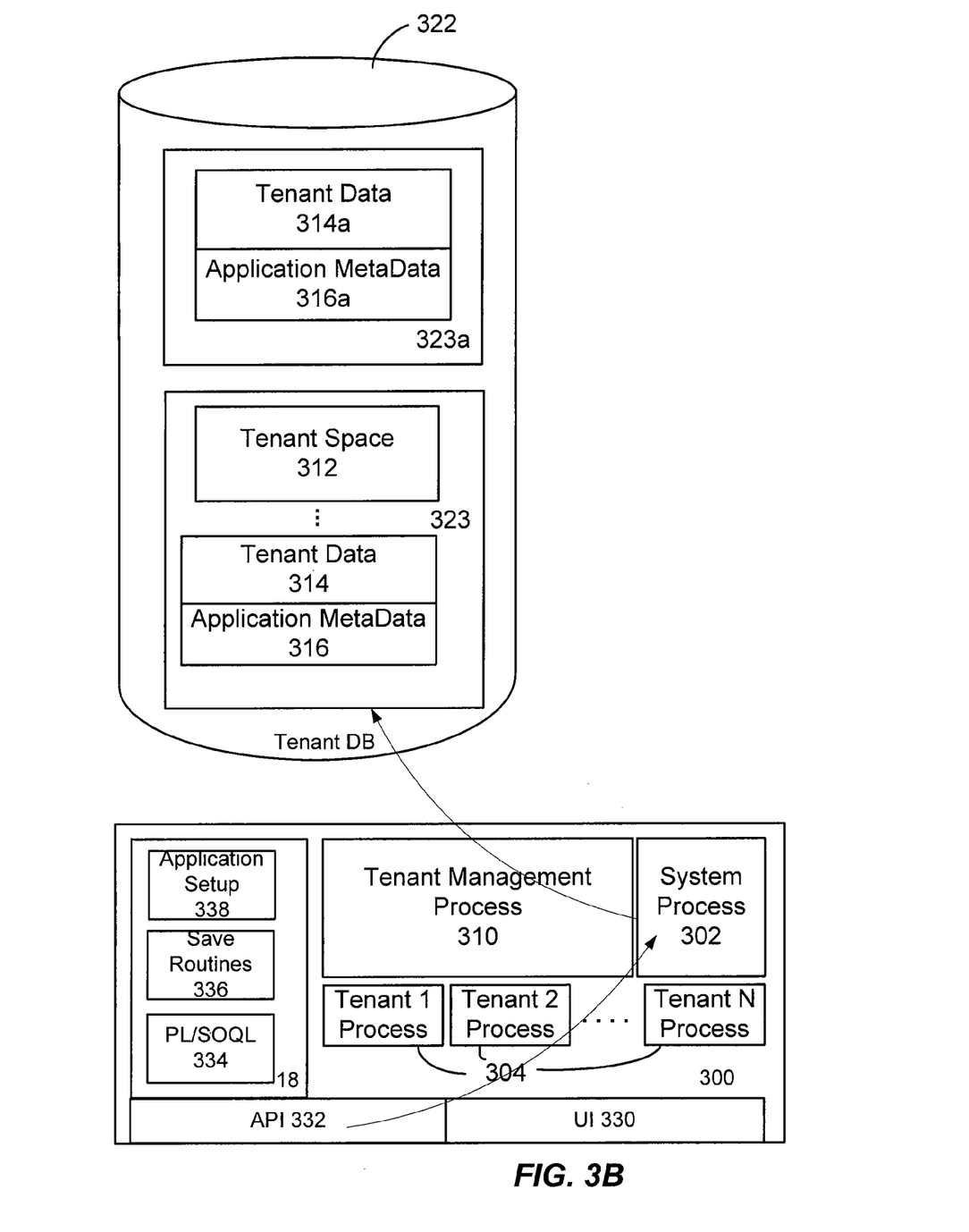
Figure 4:
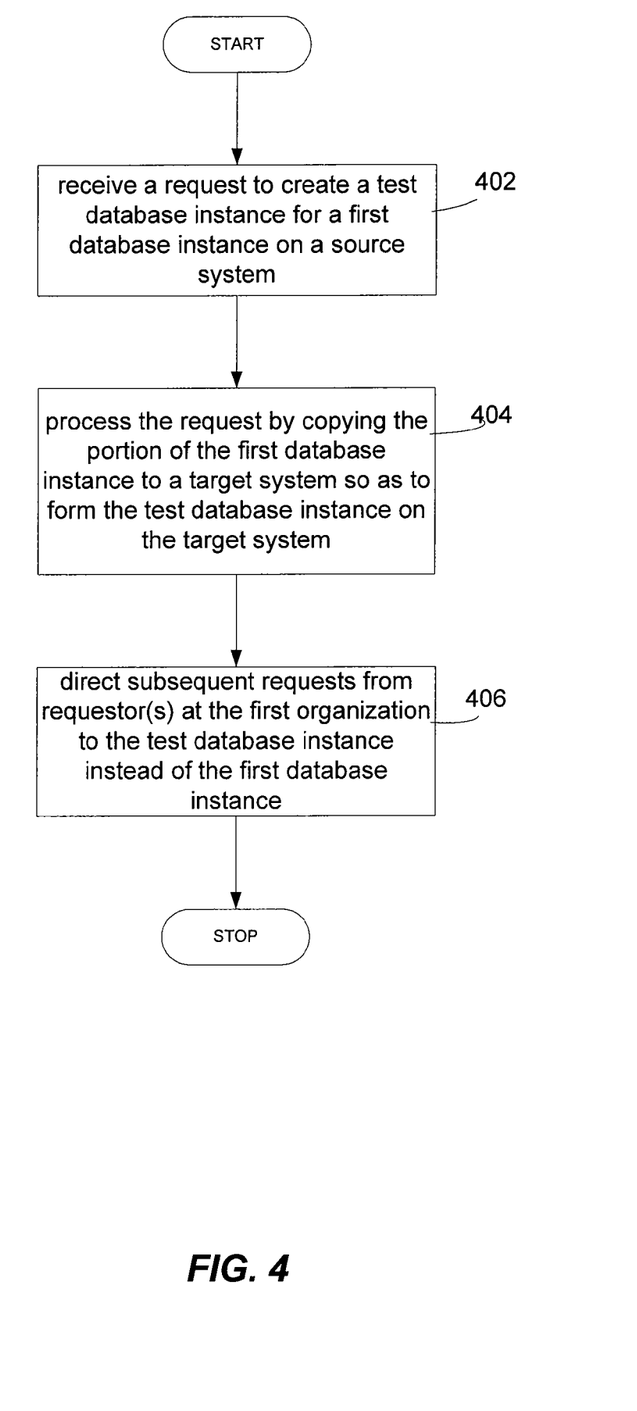
FIG. 4 illustrates an operational flow diagram illustrating a high level overview of a technique for creating a test database instance from a database instance in an embodiment.

FIGS. 3A and 3B illustrate an example architecture of a mechanism, and FIG. 4 illustrates an operational flow diagram illustrating a high level overview of a technique, for creating a test database instance from a database instance in an embodiment and by way of example. In one embodiment, the test database creation mechanism and method of FIGS. 3A and 4 are implemented in the multi-tenant database system 16 of FIG. 1. As shown in FIGS. 3A and 3B, system 300 includes a system process module 302 communicably coupled to database system 323 (e.g., tenant database 108 of FIG. 2). System process module 302 implements processes that query a queue within system 300 on a periodic basis to retrieve and process requests. In certain embodiments, system process module 302 is implemented in a separate device, such as a separate server or computer system, although it should be appreciated that process module 302 may be implemented in an application server 100 or in a database server.

As shown in FIG. 4, a request to create a test database instance for a first database instance 323 on a source system 322 is received (block 402). The request is received from a requestor at a first organization. The request may be a program produced instruction, received from an automaton requestor via the API 332 or an instruction submitted by a human requestor via the UI 330. The request identifies a portion 314, 316 of the first database instance 323 that the requestor at the first organization is permitted to access.

The request is processed (block 404) by copying the portion 314, 316 of the first database instance to a target system 322a so as to form the test database instance 323a on the target system 322a. The copy process proceeds substantially contemporaneous with, and substantially without interference with, processing of other request(s) to access other portion(s) 312 of the first database instance 323 received from other requestor(s) at other organization(s).

Subsequent requests from requestor(s) at the first organization are directed (block 406) to the test database instance 323a instead of the first database instance 323, thereby enabling testing.

In one embodiment, a copy of a database instance of an existing organization is created automatically by a set of one or more tasks executing on a target database system. The copy task(s) executing on the target system poll queues on one or more database instances associated with the multi-tenant database system. To initiate copying, in one embodiment, a user within an organization, who has the appropriate permissions (e.g., administrator), logs in to the target system and requests a copy of the organization's database residing on one of the database instances. In one embodiment, the user is provided with a user interface upon login which provides a selection mechanism, e.g., button, to request copying. In certain embodiments, the user may select to copy only the set-up data associated with the organization's database instance, or the set-up data and instance data associated with the organization's database instance.

Upon request selection, the copy request is placed in a queue, e.g., queue table, on the database instance housing the organization's database. A process executing on the target database system on which the copy will be created polls the queues of the database instances and proceeds to copy instances based on the request order in the queues. Each request is processed asynchronously by a set of one or more tasks or threads executing on the target system. In certain embodiments, the target system is the same as a source system (database instance from which a database is copied). In other embodiments, the target system resides on a database system that is different from, and possibly remote from, the source system. Where the target system and source system are different, copying is implemented using a database link.

Resume Support

In one embodiment, interrupted jobs are automatically resumed at a last known location and any previously copied tables are skipped. For example, in one embodiment, tokens representing durable milestones during the copy process are periodically set. Upon failure, the copy process is resumed based on the tokens. Resume functions even in the event of catastrophic failures at the batch server level. Fully automated fail over support is implemented via multiple batch servers configured to process requests for the same request range/partition. Resume is implemented using a durable milestone set where major resumable events are recorded in the database as a named token.

Parallel Table Copy

In one embodiment, the number of tables that are copied concurrently is externally configurable. This configuration provides one mechanism for increasing throughput for an individual copy operation.

Metadata Only Copy

In one embodiment, the copy process is configured to copy only the metadata definition 316 for a source organization. A selection of at least one of set-up data 316 and instance data 314 may be copied by one or more tasks executing on the target system. As used herein, "set-up data" refers to the metadata for the various tables associated with an organization in the multi-tenant database system, and "instance data" refers to the business data, e.g., real data, associated with the organization. Together, the set-up data and instance data define the organization's data model, user interface, business logic and data in an on-demand multi-tenant database system.

A/B Copy

In one embodiment, A/B copy is a copy process that uses two separate target test instance databases where one is an Active target 322a and the other is an Inactive target 322b. Customers log into the Active database and the copy process copies into the Inactive database. When a request is made to create a new copy, the copy process uses the Inactive database as its target. After the copy process completes, the Active copy is marked inactive, the standard physical delete process deletes the remaining data, and the Inactive copy is activated. The process repeats itself with the roles of each target alternating every request.

Search Index File Copy

In one embodiment, search index data is stored in the file system and is copied out-of-band of the database link copy. The copy process requests a search index copy from its local search index server. The local search index server negotiates the required locking, physical file copy, and final index update on behalf of the copy process.

Multiple Virtual Queues

In one embodiment, multiple concurrent copy processes can be configured to provide both fail over and/or scale up. A copy process can be configured to operate on specific source organization size ranges. A copy process can also be configured to operate only during specific time windows to reduce or minimize the impact of the copy process(es) on system resources.

RAC Support

In one embodiment, the copy process is fully Oracle® Real Application Clusters (RAC) aware on both the source and target. Oracle RAC is a cluster type database with a shared cache architecture. In an embodiment, organization-to-database node multiplexing may be achieved using a node selection (node hash) mechanism. The node selection mechanism is applied to both source and target systems to provide improved data transfer characteristics.

Local Copying

In one embodiment shown in FIG. 3B, organization ID rewriting is used during the copy process to provide a copy of the source organization within the same database 322. Source to source copy is currently used during an automated testing process.

Soft Trigger Disable

In one embodiment, context level trigger logic disabling support is used to suppress certain triggers. A database trigger is a stored procedure that is invoked automatically when a predefined event occurs. The following are examples of some types of triggers that can be disabled in various embodiments:

Search Name Lookup
Name Denormalization
Custom Indexing
Search Indexing
Delete Logging In one embodiment, the normal behavior of SYSTEM-MODSTAMP is disabled during copy to preserve the original source values for this field. Such disabling provides support to the bulk updating operations (e.g. Bulk Search Indexing) that rely on the time stamp to perform only incremental updates.

In one embodiment, instead of using a database to database via database link for the transport mechanism, an out-of-band mechanism can be used.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of creating a test database instance from a database instance, the method comprising:

receiving a request to create a test database instance for a first database instance on a source system, the request received from a requestor at a first organization and the request identifying a portion of the first database instance that the requestor at the first organization is permitted to access;

queuing the request to a processing queue;

handling the request from the processing queue by copying the portion of the first database instance to a target system so as to form the test database instance on the target system, while processing at least one other request to access other portion(s) of the first database instance received from other requestor(s) at other organization(s); and directing test-related requests from requestor(s) at the first organization to the test database instance instead of the first database instance.

2. The method of claim 1, wherein processing the request from the queue includes:

copying, by one or more tasks executing on the target system, at least one of set-up data and instance data over a database link between the source system and the target system.

3. The method of claim 1, wherein the target system is the same as the source system.

4. The method of claim 3, further comprising:
rewriting an identifier of an organization associated with the portion of the first database instance so that the test database instance can reside in the same database as the first database instance.

5. The method of claim 1, wherein a process on the target system identifies polls the processing queue and recognizes the request as a copy request.

6. The method of claim 1, further comprising:
providing a user configurable time window during which processing occurs.

7. The method of claim 1, further comprising:
receiving a second request from the requestor at the first organization to create a second test database instance for the first database instance;
processing the second request while continuing to allow access to the first test database instance by copying the portion of the first database instance that the requestor at the first organization is permitted to access to the target system so as to form a second test database instance on the target system; and thereafter
directing subsequent test-related requests from requestor(s) at the first organization to the second test database instance in place of the first test database instance.

8. The method of claim 7, further comprising:
deleting the first test database instance.

9. The method of claim 1, wherein the first database instance comprises multiple database tables, and processing the request by copying the portion of the first database instance to a target system so as to form the test database instance on the target system includes:
copying table-by-table asynchronously.

10. The method of claim 9, wherein copying table-by-table asynchronously includes:
copying at least two database tables concurrently using at least two copy process threads.

11. The method of claim 10, further comprising:
configuring a number of tables that are concurrently copied according to a user request.

12. The method of claim 11, wherein processing the request by copying the portion of the first database instance to a target system so as to form the test database instance on the target system includes:
setting tokens representing copy milestones, and resuming interrupted copy processing at a point determined by accessing the tokens.

13. A machine-readable medium carrying one or more sequences of instructions for creating a test database instance from a database instance in a multi-tenant database system, which instructions, when executed by one or more processors, cause the one or more processors to carry out the steps of:
receiving a request to create a test database instance for a first database instance on a source system, the request received from a requestor at a first organization and the request identifying a portion of the first database instance that the requestor at the first organization is permitted to access;
queuing the request to a processing queue;
handling the request from the processing queue by copying the portion of the first database instance to a target system so as to form the test database instance on the target system, while processing at least one other request to access other portion(s) of the first database instance received from other requestor(s) at other organization(s); and
directing test-related requests from requestor(s) at the first organization to the test database instance instead of the first database instance.

14. The machine-readable medium as recited in claim 13, wherein the instructions for carrying out the step of handling the request by copying the portion of the first database instance to a target system so as to form the test database instance on the target system include instructions for carrying out the step of:
copying, by one or more tasks executing on the target system, at least one of set-up data and instance data over a database link between the source system and the target system.

15. The machine-readable medium as recited in claim 13, further comprising instructions for carrying out the step of:
rewriting an identifier of an organization associated with the portion of the first database instance so that the test database instance can reside in the same database as the first database instance.

16. The machine-readable medium as recited in claim 13, wherein the instructions for carrying out the step of receiving a request to create a test database instance for a first database instance on a source system include instructions for carrying out the step of:
placing the request in a queue in the source system, wherein a process on the target system identifies the request as a pending copy request by polling the queue.

17. The machine-readable medium as recited in claim 13, further comprising instructions for carrying out the step of:
providing a user configurable time window during which processing occurs.

18. The machine-readable medium as recited in claim 13, further comprising instructions for carrying out the step of:
receiving a second request from the requestor at the first organization to create a second test database instance for the first database instance;
queuing the request to a processing queue;
handling the request from the processing queue by copying the portion of the first database instance to a target system so as to form the test database instance on the target system, while processing at least one other request to access other portion(s) of the first database instance received from other requestor(s) at other organization(s); and
directing test-related requests from requestor(s) at the first organization to the test database instance instead of the first database instance.

19. An apparatus for creating a test database instance from a database instance in a multi-tenant database, the apparatus comprising:
a processor; and
one or more stored sequences of instructions which, when executed by the processor, cause the processor to carry out the steps of:
receiving a request to create a test database instance for a first database instance on a source system, the request received from a requestor at a first organization and the request identifying a portion of the first database instance that the requestor at the first organization is permitted to access;
queuing the request to a processing queue;
handling the request from the processing queue by copying the portion of the first database instance to a target system so as to form the test database instance on the target system, while processing at least one other request to access other portion(s) of the first database instance received from other requestor(s) at other organization(s); and directing test-related requests from requestor(s) at the first organization to the test database instance instead of the first database instance.

\* \* \* \* \*